United States Patent
Flick et al.

(10) Patent No.: US 6,278,033 B1
(45) Date of Patent: Aug. 21, 2001

(54) CATALYST AND PROCESS FOR PURIFYING STREAMS OF MATERIALS

(75) Inventors: Klemens Flick, Herxheim; Ruprecht Meissner, Weisenheim; Werner Hefner, Lampertheim; Rainer Feser, Grünstadt; Fabian Kunz, Mutterstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/726,259

(22) Filed: Nov. 30, 2000

Related U.S. Application Data

(62) Division of application No. 09/385,457, filed on Aug. 30, 1999, now Pat. No. 6,204,218.

(30) Foreign Application Priority Data

Sep. 4, 1998 (DE) .............................. 198 40 372

(51) Int. Cl.$^7$ .................................. C07C 7/163
(52) U.S. Cl. .................... 585/262; 585/260; 585/259; 585/258; 208/301; 208/302
(58) Field of Search ................... 585/258, 259, 585/260, 262; 208/301, 302

(56) References Cited

U.S. PATENT DOCUMENTS

| | | | |
|---|---|---|---|
| 2,837,587 | 6/1958 | Hogan et al. ............... | 260/603 |
| 3,420,618 | 1/1969 | Fleming ..................... | 23/2 |
| 3,537,981 | 11/1970 | Parker et al. ............... | 208/143 |
| 4,409,410 | 10/1983 | Cosyns et al. .............. | 585/259 |
| 4,547,600 | * 10/1985 | Cosyns et al. .............. | 585/259 |
| 4,861,939 | 8/1989 | Debras et al. .............. | 585/820 |
| 5,475,173 | * 12/1995 | Cheung et al. .............. | 585/259 |
| 5,516,851 | 5/1996 | Flick et al. ................. | 525/330 |
| 5,847,250 | * 12/1998 | Flick et al. ................. | 585/260 |
| 6,127,588 | * 10/2000 | Kimble et al. .............. | 585/260 |

FOREIGN PATENT DOCUMENTS

| | | |
|---|---|---|
| 2205416 | 11/1997 | (CA) . |
| 197 10 762 | 9/1998 | (DE) . |
| 569624 | 11/1993 | (EP) . |
| 60-248237 | 12/1985 | (JP) . |

OTHER PUBLICATIONS

Altrip et al., MetCon '93 Conference, Session 4, May 27, 1993, "Maximizing Metallocene Performance through Olefin Purification", Mar. 12, 1993.

*Oil & Gas Journal,* Oct. 1994, pp. 50–55.

* cited by examiner

*Primary Examiner*—Walter D. Griffin
(74) *Attorney, Agent, or Firm*—Keil & Weinkauf

(57) ABSTRACT

A catalyst which contains, in its active composition, from 0.05 to 1.0% by weight of at least one metal or compound of a metal of the 10th group of the Periodic Table of the Elements and from 0.05 to 1.0% by weight of at least one metal or compound of a metal of the 11th group of the Periodic Table of the Elements, with the weight ratio of the metal of the 11th group to the metal of the 10th group being from 0.95 to 1.05, and, as support, an $SiO_2$-containing catalyst support having a BET surface area of from 2 to 400 m$^2$/g, wherein at least 20% of the total pore volume of the catalyst is made up by pores having a diameter greater than 100 nanometers, can be used in processes for removing alkynes, dienes and/or monounsaturated hydrocarbons from streams of materials.

5 Claims, No Drawings

US 6,278,033 B1

CATALYST AND PROCESS FOR PURIFYING STREAMS OF MATERIALS

This application is a divisional of application Ser. No. 09/385,457, filed Aug. 30, 1999, now U.S. Pat. No. 6,204,218.

The present invention relates to a catalyst and a process for removing alkynes, dienes, monounsaturated hydrocarbons and/or oxygen from streams of materials.

In many different chemical processes, a stream of materials is reacted over one or more catalysts to produce reaction products. An example of such a process is the polymerization of olefins such as ethylene or propylene over metallocene catalysts to give the corresponding polyolefin.

The catalysts used in such processes are in most cases sensitive to certain impurities, known as catalyst poisons which if they come into contact with the catalyst in excessive quantities adversely affect its properties such as activity, selectivity or operating life. In general, active centers of the catalyst are occupied by the catalyst poison and are thus no longer available for catalyzing the desired reaction. When using catalysts, care therefore has to be taken that the feed streams with which the catalysts are brought into contact do not carry any catalyst poisons or at most that amount of catalyst poisons which, at an economically justifiable outlay for the removal of catalyst poisons, makes it possible for the catalyst to be operated economically satisfactorily in respect of selectivity, activity and operating life. Known catalyst poisons for many metallic catalysts are, for example, sulfur, arsenic and antimony.

Some impurities which are present in feed streams do not permanently damage the catalyst used but lead to undesirable secondary reactions and thus reduce, for example, the product quality. An example of such impurities are alkynes in olefins in metallocene-catalyzed olefin polymerization which adversely affect the important product properties such as molecular weight distribution, the stereospecificity of the polymerization or the stability of the polymer products. Such problems can of course also occur in uncatalyzed reactions.

As a rule, therefore, a feed stream goes through a purification process before being used in a reaction in order to remove impurities which would cause problems in the reaction concerned. Numerous purification processes of this type are known, for example scrubbing with various solvents, processes for adsorption of impurities on adsorbents such as zeolites or activated carbon, or processes in which undesirable impurities are removed from a stream by means of membranes.

For example, U.S. Pat. No. 4,861,939 teaches a process for removing arsenic from naphtha, in which the naphtha is largely freed of arsenic-containing compounds by contact with an adsorbent comprising nickel oxide and nickel.

Processes in which catalysts are used to purify streams of materials are rarer and are usually restricted to the removal of a few specific impurities in specific streams. The hydrogenative desulfurization of hydrocarbons over $CoO/MoO_3$— or $NiO/MoO_3$ catalysts at from 350 to 450° C. and subsequent absorption of the hydrogen sulfide formed, the high- or low-temperature reaction of carbon monoxide with water over $FeO/Cr_2O_3$— or $CoO/MoO_3$ catalysts to form carbon dioxide and hydrogen and the methanization of CO and $CO_2$ using hydrogen over nickel catalysts are the best known processes and are general text book knowledge.

Oil & Gas Journal, October 1994 issue, pages 50 to 55, describes the "Triple P" or "Propylene Polishing Process" of Fina Research FA, Feluy, Belgium. This process is used to remove sulfur-containing compounds, arsine and stibine, oxygen, CO and $CO_2$ as well as hydrogen from propylene in order to produce highly pure propylene for polymerization. The process utilizes a specific adsorbent which is not disclosed in detail for the adsorbtive removal or all impurities apart from hydrogen; this adsorbent additionally acts as catalyst for the hydrogenation of propene with hydrogen and thus removes the hydrogen catalytically.

U.S. Pat. No. 3,420,618 teaches a process for removing acetylene, ethylene and oxygen from a synthesis gas stream by hydrogenation over a catalyst comprising palladium on an aluminum oxide support.

In a paper presented by D. J. Artrip, C. Herion and R. Meissner at the "MetCon '93", session four, May 27, 1993, in Houston, Tex., USA, a four-stage process for removing various impurities from olefin streams for polymerization reactions was disclosed. In this process, arsenic- and sulfur-containing compounds are adsorbed on an adsorbent comprising copper oxide and zinc oxide in a first step. In a second step, acetylene and dienes are hydrogenated to olefins over a palladium-containing catalyst after addition of an amount of hydrogen sufficient to hydrogenate them. In the third process step, oxygen present is removed over a metallic copper catalyst. In the fourth and last process step, residual carbon monoxide which is still present is converted into carbon dioxide over a copper oxide catalyst and any remaining hydrogen is likewise oxidized to water.

The patent application DE 19710762.1 (equivalent: PCT EP98/01469) teaches a process for purifying streams of materials in not more than three process steps, in which a palladium- and silver-containing catalyst on an $SiO_2$-containing catalyst support is used in the first purification stage to remove alkynes, dienes, monounsaturated hydrocarbons and/or oxygen from streams of materials.

DE-A 31 19 850 teaches the use of a catalyst comprising from 0.05 to 0.5% by weight of palladium and from 0.05 to 1% by weight of silver on a silicon dioxide support having a BET surface area of from 10 to 200 $m^2/g$ for the selective hydrogenation of butadiene in a $C_4$ fraction. Specific embodiments of this catalyst are those having a weight ratio of silver to palladium of from 0.7:1 to 3:1 and from 1:1 to 2.5:1.

JP-A 60-248237 discloses a process for producing a catalyst support having a high proportion of macropores. EP-A 653 243 teaches a process for producing catalysts whose active composition is essentially present in mesopores and macropores.

In view of the great importance of purified streams of materials in industrial chemistry, there is still a need for new and improved gas purification processes.

It is an object of the present invention to find a catalyst and a purification process by means of which alkynes, dienes, monounsaturated hydrocarbons and/or oxygen can be removed from streams of materials in a simple manner without having to accept the disadvantages of the known catalysts and processes. It is a particular object of the present invention to find a catalyst which is largely resistant to sulfur-, arsenic- and/or antimony-containing catalyst poisons and a process by means of which alkynes, dienes, monounsaturated hydrocarbons and/or oxygen can be removed in a simple manner from streams contaminated with sulfur-, arsenic- and/or antimony-containing catalyst poisons.

We have found that this object is achieved by a catalyst comprising, in its active composition, from 0.05 to 1.0% by weight of at least one metal or compound of a metal of the 10th group of the Periodic Table of the Elements and from 0.05 to 1.0% by weight of at least one metal or compound of a metal of the 11th group of the Periodic Table of the Elements, with the weight ratio of the metal of the 11th group to the metal of the 10th group being from 0.95 to 1.05, and, as support, an $SiO_2$-containing catalyst support having a BET surface area of from 2 to 400 m$^2$/g, wherein at least 20% of the total pore volume of the catalyst is made up by pores having a diameter greater than 100 nanometers.

Furthermore, we have found a process for removing alkynes, dienes, monounsaturated hydrocarbons and/or oxygen from streams of materials by hydrogenation, which comprises reacting the stream comprising alkynes, dienes, monounsaturated hydrocarbons and/or oxygen with hydrogen in the presence of the catalyst of the present invention.

The catalyst of the present invention displays, in particular, a very high tolerance to sulfur-, arsenic- and/or antimony-containing catalyst poisons in the feed, which makes it possible for it to be used in an economically satisfactory manner in a process for the hydrogenation of alkynes, dienes, monounsaturated hydrocarbons and/or oxygen in streams contaminated by such catalyst poisons. The catalyst is not deactivated by sulfur-, arsenic- and/or antimony-containing catalyst poisons in the feed, its activity in the hydrogenation of alkynes, dienes, monounsaturated hydrocarbons and/or oxygen is virtually unaffected by such catalyst poisons so that long operating lives can be achieved and at the same time any alkynes present, in particular acetylene, can be removed before the removal of sulfur-, arsenic- and antimony-containing catalyst poisons which is customarily carried out using copper-containing catalysts, so that any problem with the formation of copper acetylides or other deposits (fouling) can be ruled out.

The catalyst of the present invention comprises at least 0.05% by weight, calculated as metal, of at least one metal or compound of a metal of the 11th group of the Periodic Table of the Elements and at least 0.05% by weight, calculated as metal, of at least one metal or compound of a metal of the 10th group of the Periodic Table of the Elements. For example, the catalyst comprises more than 0.1% by weight and preferably more than 0.2% by weight of each metal or group of metals. The catalyst comprises at most 1.5% by weight of each metal or group of metals (or metal compound or group of metal compounds), for example less than 1.0% by weight in each case and preferably less than 0.7% by weight in each case.

The numbering of the groups of the Periodic Table of the Elements follows the current numbering recommended by the International Union for Pure and Applied Chemistry (IUPAC). The 10th group consists of the elements nickel, palladium and platinum and the 11th group consists of the elements copper, silver and gold. As metal or compound of a metal of the 10th group, the catalyst comprises, for example, palladium or a palladium-containing compound, preferably as sole metal or sole compound of a metal of this group, and as metal or compound of a metal of the 11th group it comprises, for example, silver or a silver-containing compound, preferably as sole metal or sole compound of a metal of this group. The active composition of the catalyst preferably comprises metallic palladium and metallic silver; particularly preferably, the active composition consists essentially of metallic palladium and metallic silver.

The weight ratio of the metal of the 11th group to the metal of the 10th group is from 0.95 to 1.05. This ratio is, for example, greater than 0.97 and preferably greater than 0.985. It is, for example, less than 1.03 and preferably less than 1.015. It is very particularly preferably 1.

The catalyst comprises a catalyst support comprising silicon dioxide and having a BET surface area of from 2 to 400 m$^2$/g. The BET surface area is, for example, more than 5 m$^2$/g and preferably more than 10 m$^2$/g. It is, for example, less than 300 m$^2$/g, preferably less than 200 m$^2$/g and particularly preferably less than 40 m$^2$/g. The catalyst support preferably comprises kieselguhr.

The catalyst has mesopores and/or macropores. For the purposes of the present invention mesopores are pores having a diameter of from 20 to 100 nanometers and macropores are pores having a diameter of more than 100 nanometers. In general, at least 20% of the total pore volume of the catalyst is made up by macropores. Preferably, at least 30% of the total pore volume, particularly preferably at least 40%, is made up by macropores.

In a particular embodiment of the catalyst of the present invention, the active composition is essentially present in the mesopores and macropores of the catalyst. In general, more than 80% by weight of the active composition, particularly preferably at least 90% by weight, is present in mesopores and macropores.

The catalysts of the present invention are produced in a manner known to those skilled in the art. In one method, a catalyst support whose pore structure and surface area essentially determines the pore structure and surface area of the finished catalyst is produced. The production of the support is therefore carried out in such a way that a catalyst support having the desired pore structure and surface area results. Suitable methods are known to those skilled in the art. The catalyst support is then usually impregnated with a solution of the constituents of the active composition or their precursor compounds, for example, the nitrates, dried and the constituents of the active composition or their precursors are converted into the finished active composition by calcination and/or are subjected to a reduction of the components of the active composition to the metal, for example by hydrogenation in the reactor. As an alternative, the constituents of the active composition can be incorporated into the support while it is being produced. Examples of methods which can be employed are given in JP-A 60-248 237 and EP-A 653 243.

In the process of the present invention for removing alkynes, dienes, monounsaturated hydrocarbons and/or oxygen from streams of materials by hydrogenation, the alkynes, dienes, monounsaturated hydrocarbons and/or oxygen present in the stream are reacted with hydrogen in the presence of the catalyst of the present invention. In a particular embodiment, alkynes, dienes, monounsaturated hydrocarbons and/or oxygen are removed from streams contaminated with sulfur-, arsenic- and/or antimony-containing catalyst poisons by reaction with hydrogen in the presence of the catalyst of the present invention.

The process of the present invention removes alkynes, dienes, monounsaturated hydrocarbons and/or oxygen from, for example, olefin streams for polymerization, specifically over metallocene catalysts, from pyrolysis gases produced in plastics recycling plants or from streams which are contaminated with sulfur-, arsenic- and/or antimony-containing catalyst poisons and with compounds which can be removed by hydrogenation.

The process of the present invention can be carried out either in the gas phase or in the liquid phase. In the latter case, either a downflow or upflow mode can be selected. For the hydrogenation, the necessary amount of hydrogen is added upstream of the hydrogenation reactor. The amount of hydrogen to be added is determined by the impurities which are present and are to be removed; it is advantageous to add an excess, for example a two-to three-fold excess, of hydrogen. In general, the hydrogen is virtually completely consumed in the hydrogenation reactor. Alkynes and dienes are hydrogenated preferentially over monounsaturated hydrocarbons, so that the process of the present invention also makes it possible to remove alkynes and dienes from olefin streams. For example acetylene present in ethylene streams or propine or propadiene present in propylene streams or vinylacetylene present in butadiene streams can be removed by hydrogenation. A certain, but comparatively small, proportion of alkene hydrogenation to form the corresponding alkanes is, however, usually unavoidable. In the process of the present invention, oxygen is also removed from the stream together with the organic unsaturated compounds to an extent determined by the amount of hydrogen added.

The process of the present invention is carried out under hydrogenation conditions customary for hydrogenation catalysts comprising noble metals, for example at room temperature or temperatures above room temperature, preferably at or above 40° C. and particularly preferably at or above 50° C. If the process is carried out in the gas phase, it is usually carried out at or below 200° C., preferably at or below 180° C. and particularly preferably at or below 150° C. If the process is carried out in the liquid phase, it is usually carried out at or below 150° C., preferably at or below 100° C. and particularly preferably at or below 80° C. The pressure to be employed is, when the process is carried out in the gas phase, usually above atmospheric pressure, preferably above 5 bar and particularly preferably at or above 10 bar, and usually below 50 bar, preferably below 40 bar and particularly preferably at or below 30 bar. When the process is carried out in the liquid phase, the pressure is usually above 5 bar, preferably above 10 bar and particularly preferably at or above 15 bar, and usually below 100 bar, preferably below 80 bar and particularly preferably at or below 50 bar. The throughput through the reactor, expressed as the space velocity, is, when the process is carried out in the gas phase, usually more than 100 $h^{-1}$, for example more than 500 $h^{-1}$ and preferably 1,000 $h^{-1}$ or more, and usually less than 10,000 $h^{-1}$, for example less than 6,000 $h^{-1}$ and preferably 4,000 $h^{-1}$ or less. When the process is carried out in the liquid phase, the throughput through the reactor, expressed as the space velocity, is usually at least 0.1 $h^{-1}$, for example more than 0.5 $h^{-1}$ and preferably 1 $h^{-1}$ or more, and usually at most 20 $h^{-1}$, for example less than 10 $h^{-1}$ and preferably 5 $h^{-1}$ or less. As in the case of virtually all hydrogenation catalysts, a certain slow buildup of carbon deposits on the catalyst is possible, but these can be removed by periodic decarbonization by treatment of the catalyst with steam and air in a manner known to those skilled in the art. In general, cycle lengths of from 1 to 2 years can be achieved when the hydrogenation is carried out in the gas phase and cycle lengths of from 2 to 3 years can be achieved when the hydrogenation is carried out in the liquid phase. The total life of the catalyst can be from 5 to 10 years.

After carrying out the process of the present invention, the stream to be purified can still comprise sulfur-, arsenic- and/or antimony-containing catalyst poisons, oxygen which has not reacted completely, carbon monoxide and/or hydrogen. These impurities can, if necessary, be removed in further purification steps.

For this purpose, for example, sulfur-, arsenic- and/or antimony-containing catalyst poisons and/or residual oxygen are removed or partially removed in a second purification step by adsorption on a catalyst and/or residual oxygen, carbon monoxide and/or residual hydrogen are at least partially reacted catalytically to form water and carbon dioxide. In this purification step, sulfur-, arsenic- and/or antimony-containing compounds and/or residual oxygen still present are removed from the stream. For this purpose, the stream is, after having been treated by the process of the present invention, passed in a reactor over a catalyst which absorbs sulfur-, arsenic- and antimony-containing compounds and absorbs oxygen and/or removes oxygen from the stream by catalyzing its reaction with carbon monoxide and/or hydrogen. This can be achieved, for example, using the catalysts comprising copper oxide and zinc oxide which are known to those skilled in the art and have been described by Artrip et al., loc cit, as long as these further comprise metallic copper.

If necessary, remaining carbon monoxide and hydrogen can be removed from the stream to be purified in a third purification step by passing it over a catalyst which removes carbon monoxide and/or hydrogen from the stream by absorption and/or by chemical reactions. This can be achieved, for example, using the catalysts comprising copper oxide and zinc oxide which are known to those skilled in art and have been described by Artrip et al., loc cit.

If the stream to be purified does not have to be freed of sulfur-, arsenic- and/or antimony-containing catalyst poisons and/or excess oxygen, the second purification step described can be omitted and the third purification step described can be carried out directly after the process of the present invention.

The catalysts described react with carbon monoxide to form metallic copper and carbon dioxide and with hydrogen to form metallic copper and water. In operation, the copper oxide present in the catalyst is thus gradually converted into metallic copper and the capability of the catalyst for converting carbon monoxide and hydrogen into carbon dioxide and water becomes exhausted over the course of time. In the second and third purification steps, it is in principle possible to use identical catalysts which differ only in that the catalyst of the second purification step contains, when it is first used, a proportion of metallic copper which in the presence of a stoichiometric excess of oxygen over the carbon monoxide and hydrogen in the stream is gradually converted into copper oxide while the catalyst of the third purification step when it is first used contains no metallic copper but the copper oxide is gradually converted into metallic copper by reaction with carbon monoxide and hydrogen. It is thus possible to use the same catalyst, in one case in the partially reduced state and in the other case in the oxidized state, for both the second and third purification steps. Such catalysts are commercially available and can be obtained, for example, under the name R3-15 from BASF Aktiengesellschaft, Ludwigshafen, Germany.

Such a combination of purification steps avoids the disadvantages of the known purification processes, in particular massive fouling problems or the possibility of copper acetylide formation and, with at most three purification steps, is also more economical than the known processes.

Streams from which the impurities mentioned have been removed by the processes described comprise proportions of by-products formed in the course of the purification, namely carbon dioxide, water and/or alkanes. These by-products are generally inert in further reactions to which the purified streams are subjected. However, if necessary or desired these by-products can also be removed from the purified stream after carrying out the process of the present invention using methods known to those skilled in the art, for example by absorption on microporous solids.

EXAMPLE 40 kg of Celite® 209 kieselguhr (trademark of Manville Corp., U.S.A.) and 12.9 kg of $SiO_2$ powder (obtainable under the name D11-10 from BASF Aktiengesellschaft, Ludwigshafen) were intimately mixed with 1 kg of Aqualic® CA W3 polyacrylate (obtainable from BASF Aktiengesellschaft, Ludwigshafen) in a Mix-Muller (pan mill). 44 kg of deionized water were added while mixing in the pan mill. Over a period of 5 minutes, 3.6 kg of sodium water glass solution and 2.7 liters of a 25% strength aqueous ammonia solution were added. After mixing in the pan mill for 15 minutes, a further 3 liters of water were added. The resulting mass was extruded to produce 4 mm extrudates, then dried for 2 hours at 120° C. and calcined for 2 hours at 800° C. The resulting support had a tapped density of 500 g/l and a total porosity of 0.76 ml/g. The proportion of the total porosity made up by macropores was 100% and its BET surface area was 3.8 $m^2/g$. As components of the active composition, palladium and silver were applied by impregnation with an aqueous solution of palladium nitrate and silver nitrate using the "incipient wetness" method (i.e. the impregnation solution is just completely absorbed by the support). The impregnated extrudates were dried at 120° C. for 16 hours and calcined at 250° C. for 5 hours. The finished catalyst contained 0.5% by weight of palladium and 0.5% by weight of silver.

We claim:

1. A process for removing alkynes, dienes, monounsaturated hydrocarbons and/or oxygen from streams of materials by hydrogenation, which comprises reacting the stream comprising alkynes, dienes, monounsaturated hydrocarbons and/or oxygen with hydrogen in the presence of a catalyst comprising, in its active composition, from 0.05 to 1.0% by weight of palladium or a palladium compound and from 0.05 to 1.0% by weight of silver or a silver compound, with the weight ratio of silver to palladium being from 0.95 to 1.05, and, as support, an $SiO_2$-containing catalyst support having a BET surface area of from 2 to 400 $m^2/g$, wherein at least 20% of the total pore volume of the catalyst is made up by pores having a diameter greater than 100 nanometers.

2. A process as claimed in claim 1, wherein a stream contaminated with sulfur-, arsenic- and/or antimony-containing catalyst poisons is used.

3. A process as claimed in claim 2; wherein, in a subsequent second purification step, sulfur-, arsenic- and/or antimony-containing compounds and/or residual oxygen are partially or completely removed from the stream by adsorption on a catalyst and/or residual oxygen, any carbon monoxide and/or residual hydrogen present are at least partially converted catalytically into water and carbon dioxide.

4. A process as claimed in claim 2, wherein, in a subsequent second purification step, any carbon monoxide and/or residual hydrogen present are converted into carbon dioxide and/or water over a catalyst.

5. A process as claimed in claim 3, wherein, in a subsequent third purification step, any carbon monoxide and/or residual hydrogen present are converted into carbon dioxide and/or water over a catalyst.

* * * * *